United States Patent
Crandall

(10) Patent No.: US 11,940,780 B2
(45) Date of Patent: *Mar. 26, 2024

(54) SYSTEM AND METHOD FOR FABRICATION OF PROMOTIONAL VEHICLE COMPONENTS

(71) Applicant: Cord Group LLC, Placentia, CA (US)

(72) Inventor: Robert Crandall, Yorba Linda, CA (US)

(73) Assignee: CORD GROUP LLC, Placentia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,935

(22) Filed: Jun. 11, 2021

(65) Prior Publication Data

US 2021/0302947 A1 Sep. 30, 2021

Related U.S. Application Data

(63) Continuation of application No. 16/259,972, filed on Jan. 28, 2019, now Pat. No. 11,036,210.

(60) Provisional application No. 62/623,089, filed on Jan. 29, 2018.

(51) Int. Cl.
| | |
|---|---|
| *G05B 19/418* | (2006.01) |
| *B60R 3/00* | (2006.01) |
| *G06Q 10/0631* | (2023.01) |
| *B33Y 50/02* | (2015.01) |

(52) U.S. Cl.
CPC ........ *G05B 19/41865* (2013.01); *B60R 3/002* (2013.01); *G06Q 10/06316* (2013.01); *B33Y 50/02* (2014.12)

(58) Field of Classification Search
None
See application file for complete search history.

(56) References Cited

U.S. PATENT DOCUMENTS

| | | | |
|---|---|---|---|
| 6,305,769 B1 * | 10/2001 | Thayer | B33Y 30/00 347/1 |
| 8,185,446 B1 | 5/2012 | Kuznetsova et al. | |
| 11,036,210 B2 * | 6/2021 | Crandall | B33Y 80/00 |
| 2002/0099524 A1 | 7/2002 | Sell et al. | |
| 2003/0055812 A1 | 3/2003 | Williams et al. | |
| 2005/0267816 A1 * | 12/2005 | Jaramillo | G06Q 30/0601 705/26.9 |

(Continued)

OTHER PUBLICATIONS

Non-Final Office Action on co-pending (U.S. Appl. No. 16/259,972) dated Apr. 7, 2020.

(Continued)

*Primary Examiner* — Bernard G Lindsay
(74) *Attorney, Agent, or Firm* — KOS IP Law LLP

(57) ABSTRACT

Systems and methods for producing vehicle components or components for use with vehicles or in other non-vehicle applications allow an end user to select and produce at a local job site, or optionally elsewhere as desired. The system and method can allow a manufacturer or designer to send a design for a component to a consumer for the consumer to produce. The consumer can then use one of a variety of methods, such as three dimensional printing or machining, to produce the component. The consumer can produce a component from a stock data file or can customize the component before production.

26 Claims, 11 Drawing Sheets

(56) References Cited

U.S. PATENT DOCUMENTS

| | | | |
|---|---|---|---|
| 2006/0064393 A1 | 3/2006 | Orr | |
| 2008/0103806 A1 | 5/2008 | Harris | |
| 2008/0125895 A1 | 5/2008 | Baumgartner et al. | |
| 2009/0048937 A1 | 2/2009 | Contreras et al. | |
| 2010/0042952 A1 | 2/2010 | Geesey | |
| 2014/0046473 A1 | 2/2014 | Boynton et al. | |
| 2014/0122130 A1 | 5/2014 | Kelly et al. | |
| 2014/0292026 A1 | 10/2014 | Salvaggio, Jr. | |
| 2015/0127480 A1 | 5/2015 | Herrman et al. | |
| 2015/0353032 A1* | 12/2015 | Liao | G06F 3/1431 345/1.3 |
| 2016/0059786 A1* | 3/2016 | Montoya | B60R 3/002 280/163 |
| 2016/0075089 A1* | 3/2016 | Duro Royo | B29C 64/118 425/166 |
| 2016/0110479 A1* | 4/2016 | Li | A43D 1/025 703/1 |
| 2016/0333181 A1 | 11/2016 | Sybert et al. | |
| 2017/0372284 A1* | 12/2017 | Levy | G06F 30/00 |
| 2018/0281276 A1* | 10/2018 | Milroy | B33Y 70/00 |
| 2019/0012728 A1 | 1/2019 | Horn | |

OTHER PUBLICATIONS

Final Office Action on co-pending (U.S. Appl. No. 16/259,972) dated Sep. 4, 2020.

Notice of Allowance on co-pending (U.S. Appl. No. 16/259,972) dated May 3, 2021.

\* cited by examiner

SYSTEM AND METHOD FOR FABRICATION OF PROMOTIONAL VEHICLE COMPONENTS

FIELD OF ART

The field of the invention relates to systems and methods for customizing or fabrication of support members for facilitating entry and exit from a vehicle, such as adjustable steps.

BACKGROUND

Vehicles provide transportation for people and objects over distances. While many vehicles are low to the ground or have otherwise easily accessible passenger compartments, some do not and entry and exit may present a challenge. Typical examples of vehicles with more difficult access to passenger compartments include pickup trucks, sport-utility vehicles, off-road vehicles, "raised" or "lifted" automobiles and others. In these types of vehicles, the passenger compartment or compartments may be located at a height which makes entry and exit challenging for children, the elderly or infirm and even normal abled-body adults.

Various support member solutions are available for addressing the problem of easy access to a passenger's compartment including the use of running boards, attached step-ladders, handles to assist a passenger in pulling themselves up and others.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

Figure 1:
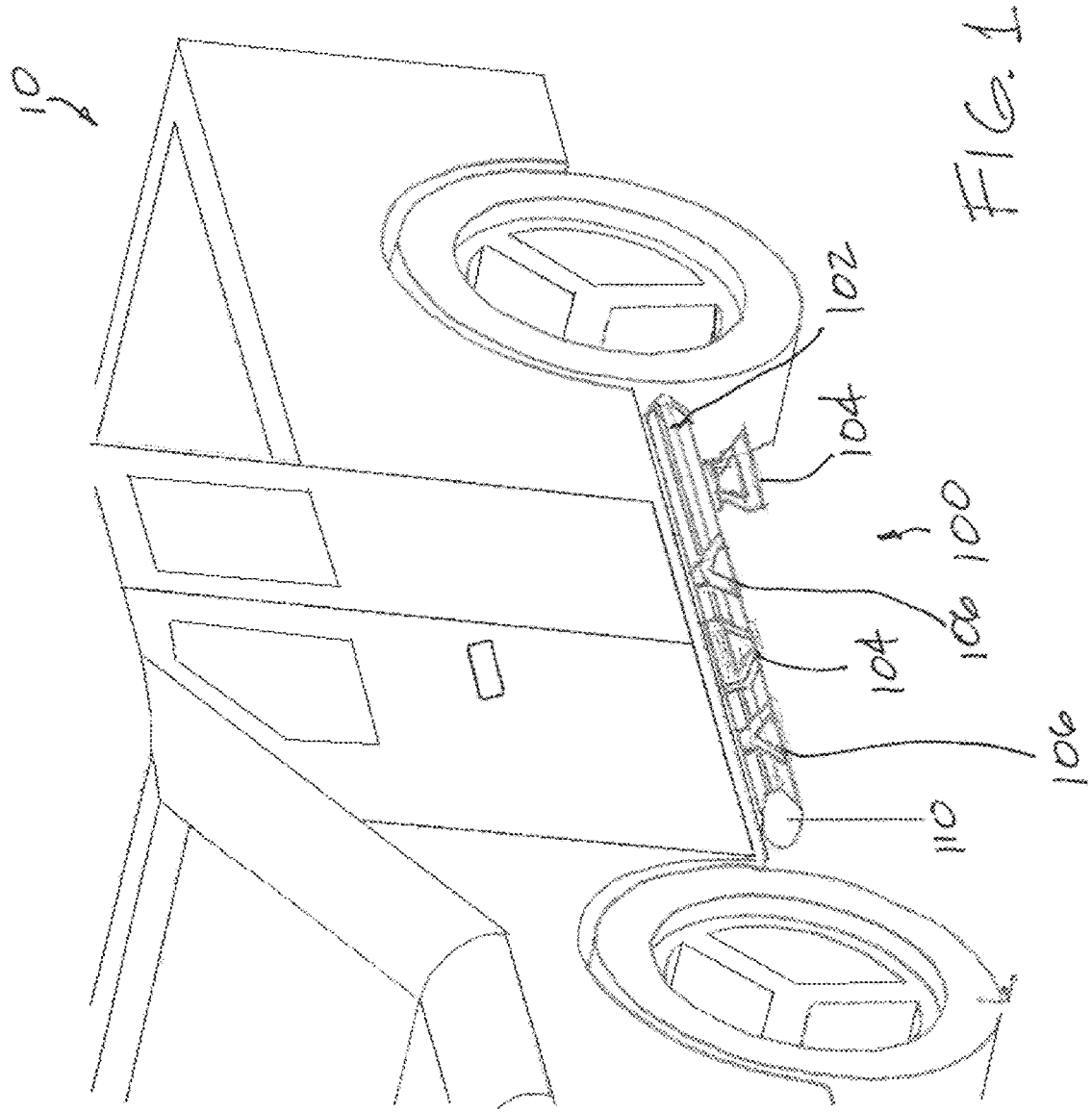
FIG. 1 is a schematic perspective view of a support device attached to a vehicle, such as a pickup truck, the support device being producible through the present disclosure.

The detailed description set forth below in connection with the appended drawings is intended as a description of the presently preferred embodiments of a system for customization or fabrication of support members provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Currently, support members, such as running boards, attached step-ladders, and handles, and related accessories are all manufactured and sold by manufacturers, or through their distributors and/or retailers, for purchase by consumers. There can be a number of reasons for this arrangement, including the necessity of accurate measurements for fitment to a vehicle and design considerations for functionality and aesthetics, maintaining of supply chains, storage consideration, industry norm, etc. Further, there is a high cost in the actual production of components and the required machines and tooling for the production. In manufacturing, economies of scale through large volume production can lower the per unit cost of a good. Thus, for these are other considerations, the market place seldom allow for customization of consumer goods that are produced in fairly large volume.

The present disclosure generally relates to a system that enables an end user to select, design, and/or customize to produce one or more components at the location of the end user for use with the manufacturer's produced goods to result in a semi-customizable end product. In some examples, the user can use one of a variety of methods, such as three dimensional (3D) printing or machining, such as with a lathe, a milling machine, or an CNC machine, to produce the one or more components. The system can offer a number of different options and design choices for use with production software and an external device or the system can directly output production code to an attached device for manufacturing of the design and then shipped to the requester or purchaser.

The system can include software for use with a computer, a downloadable application (App), and/or a web-browser dashboard for use online. The system can include design options and templates for the end user to select and produce. The manufacturer can have a repository or storage for a plurality of designs, or can provide some standard designs with more unique designs with fees. The system can allow end users to share design information and design concepts for other users to enjoy. Additionally, a user may be able to customize sections of a component in order to create a unique design for production. Still further, while aspects of the present invention are disclosed with reference to components for use with a vehicle, the invention is not limited to such end use. For example, aspects of the present invention may be used in a home, in an office environment, or in connection with personal goods, such as with a suitcase or backpack.

Figure 2:
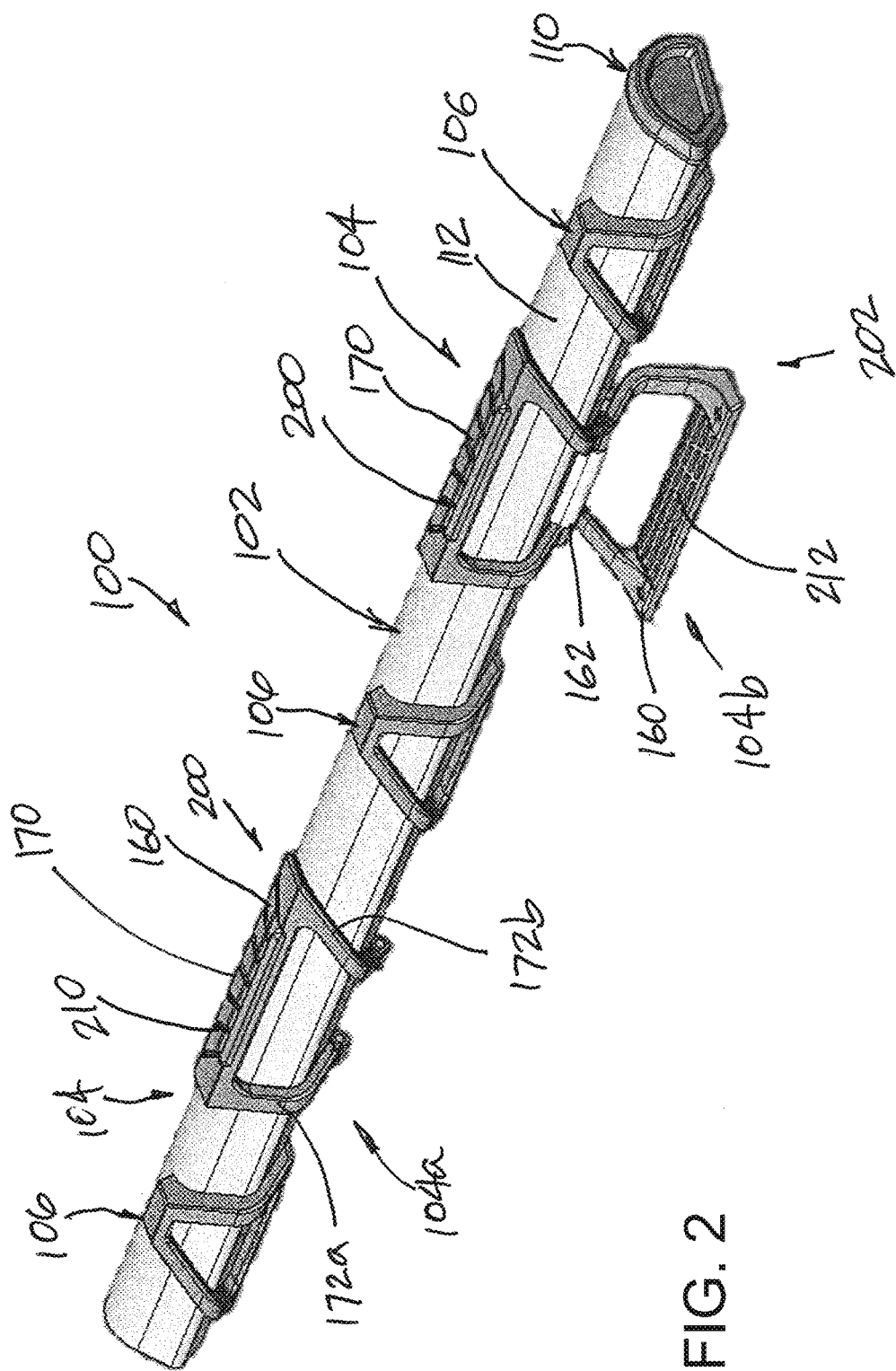
FIG. 2 is a perspective view of a support device that is an exemplary vehicle component, which can be produced through the present disclosure.

As an exemplary embodiment of components that can be produced with the system of the present disclosure, FIGS. 1 and 2 illustrate components of a support device or assembly 100, which is configured for mounting to a vehicle. Additional exemplary embodiments can be found in U.S. application Ser. No. 16/059,997, filed Aug. 9, 2018, and in U.S. Pat. No. 9,796,336, the contents of which are expressly incorporated herein by reference as if set forth in full.

FIG. 1 is an exemplary perspective view of a support device or assembly 100 mounted to a vehicle 10, such as to a pickup truck, a van or a sport utility vehicle (SUV), to name a few non-limiting examples. In the exemplary embodiment, the support device 100, also referred to as a running board, is provided with a support member 102 comprising one or more steps 104 and one or more covers or cover pieces 106 for attaching to the support device 100. The support device 100 is attached to the vehicle 10 using one or more brackets. The covers or cover pieces 106 may be incorporated as decorative or ornamental pieces only, but can also be made sufficiently sturdy for load bearing, such as for stepping on an supporting the weight of a passenger. The number of steps 104 incorporated with the support device or assembly 100 can depend on the number of doors the support device is mounted to, such as a two door truck or a four door SUV. Removable end caps 110 can be provided at the two ends of the support member 102. The end caps 110 can frictionally engage the support member 102 and can optionally incorporate fasteners, detents, or both to more permanently secure to the support member 102, such as set screws.

FIG. 2 is a perspective view of a support device or assembly 100 in accordance with aspects of the present invention, shown removed or spaced from a vehicle for further illustration. As shown, the support device or running board 100 comprises three decorative covers 106, two steps 104, and two end caps 110 (only one shown), one on each end of the support member 102. In other examples, the support device 100 can have a different number of decorative covers 106 and a different number of steps 104. For example, there can be zero decorative covers and one or more steps 104. In another example, there can be two or more decorative covers 106 and only one step 104. In still other examples, there can be more than three decorative covers 106 and one or more steps 104. The support member 102 of the running board 100 can have a non-circular shape cross-section. For example, the support member 102 can have a curved or arcuate upper surface 112 joined by generally flat segments forming a cross-section having both curved and straight segments.

FIG. 2 shows a first step 104*a* in a first folded position 200 in which the first step part 160 is folded so that the first leg or step platform 170 overlies the curved upper surface 112 of the support member 102. The second step 104*b* is depicted in both the first folded position 200 or rotated from the first folded position to be in the second extended position 202. Both the first folded position 200 and the rotated second extended position 202 are shown to provide the viewer with a better understanding that the step provided in accordance with the present embodiment has a first step part 160 that is movable relative to a second step part 162 to move between the first folded position 200 and the second extended position 202. The first step part 160 is understood to be positionable in the first folded position or the second folded position but not both at the same time as the single first leg 170 is either located over the curved upper surface 112 in the first folded position 200 or spaced from the curved upper surface in an extended position 202, but not both simultaneously. The first step part 160 is also understood to be movable relative to the support member 102 in moving between the first position and the second position.

As shown, each step 104 comprises a first step part 160 and a second step part 162. As discussed in application Ser. No. 16/059,997, the second step part 162 can slide about a channel or groove on the support member 102. Once positioned to a desired location, the second step part 162 can be removably fixed to the support member 102, such as with one or more screws or fasteners.

The first step parts 160 of the two steps 104 are rotatable relative to the support member 102 and to the second step parts 162 when the steps 104, such as when the second step parts 162 of the two steps, are fixed to the support member 102 using one or more fasteners. However, prior to fixing the second step parts 162 to the support member 102, the second step parts 162, including the entire steps 104, are movable, such as being slidable, relative to the support member 102 along the length of the support member. Once fixed, only the first step parts 160 of the steps are still movable.

Each first step part 160 has a first leg 170 and two side legs 172*a*, 172*b*. As shown, the first leg 170 of each of the steps 104 has an enlarged surface area that is sized and shaped to support one or two feet of an individual when that individual uses the step 104 to get in and out of a vehicle. The individual can step on the first leg 170 when the first step part 160 is in the first folded position 200 or in the second extended position 202. In other words, the steps 104 of the present invention are configured to be used in multiple positions, including when in a first folded position 200 or in a second extended position 202. For example, a tall person can choose to use the steps 104 with the first step parts 160 in the first folded position 200 whereas a relatively shorter person can choose to use the steps with the first step parts 160 in the second extended position 202. In either situation, the user can step onto the same first leg 170 to ingress and egress from the vehicle.

The first leg 170 on each step has a first surface 210 and a second surface 212. One or both surfaces 210, 212 can have traction features, such as bumps or projections, to increase traction between the steps and an individual's feet or shoes. The two side legs 172*a*, 172*a* of each step 104 can taper inwardly and both can have a curved body so as to form fit around the body of the elongated support member 102.

In an example, the system of the present disclosure allows for production of one or more components of the support device or running board 100 of FIG. 2 by an end user. In other examples, the system allows for the production of a component that is unrelated to the support device, for example a customized plate for a shifter, a steering wheel, a plate, or a tag for a suitcase, to name a few non-limiting examples.

Additionally, other vehicle components can be produced through the system of the present disclosure. For example, aerodynamic, aesthetic, or other exterior parts, such as for body kits, can be produced through the present disclosure. Aerodynamic components, such as spoilers, canards, splitters, diffusers, and related mounting components, can be produced. Exterior parts, such as components for a multi-component support system, or similar mounting rack, as shown in U.S. patent application Ser. No. 14/866,520, published as US Publication No. 2016/0090048, is the contents of which are expressly incorporated herein by reference in their entirety, can be produced. Additionally, other aesthetic components, such as exterior cover plates or engine valve covers, can be produced.

Figure 3:
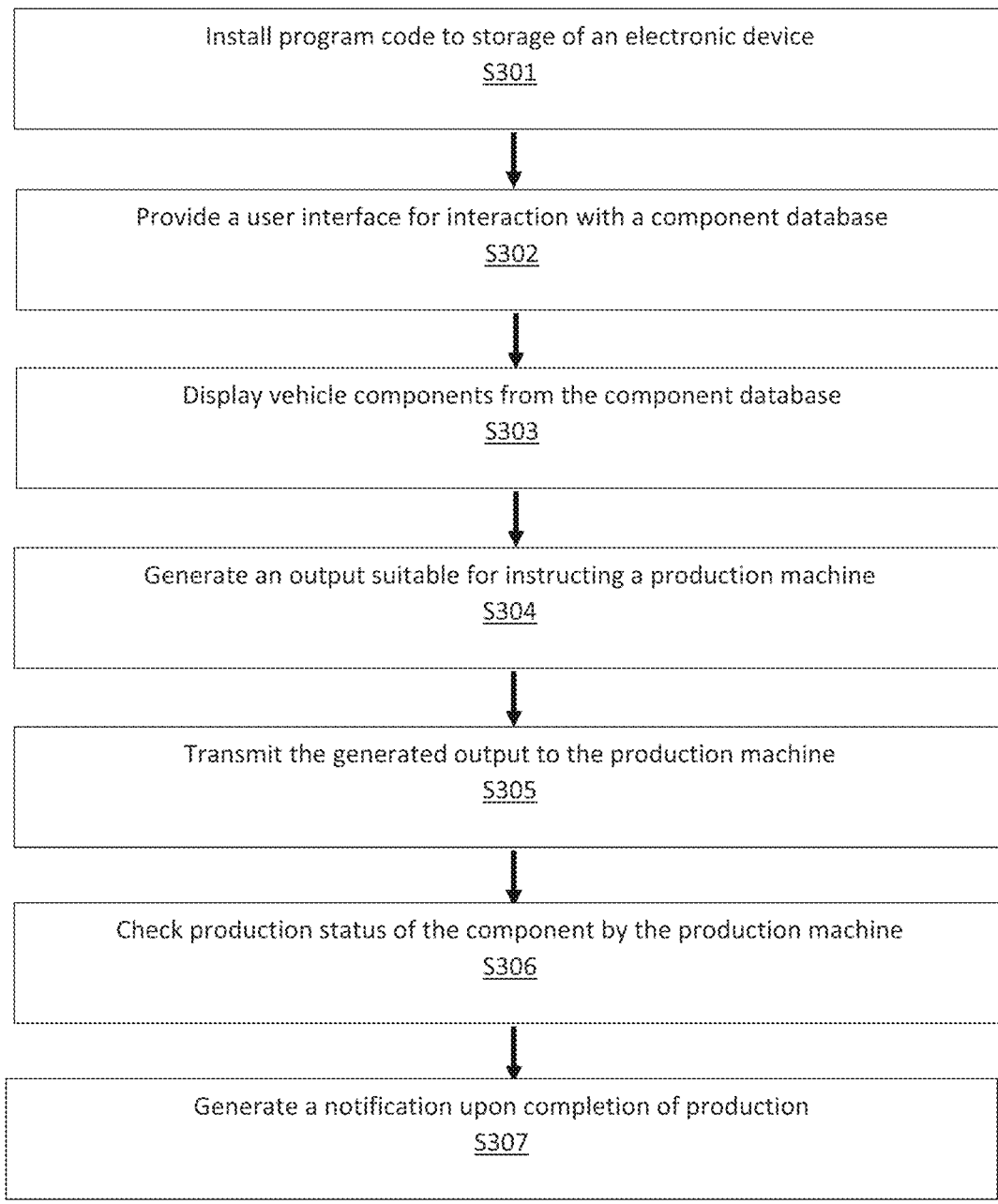
FIG. 3 shows a flowchart for an embodiment of a process for a consumer to access a design from a manufacturer and set about producing the design.

FIG. 3 illustrates a flowchart for an embodiment of a process for a consumer to access a design from a manufacturer and set about producing the design. The process can be implemented by program code stored in a computer readable storage medium for execution by at least one computer processor, such as that illustrated in FIG. 9. The program code can be considered as software or an application.

FIG. 3 illustrates a process comprising step S301 wherein the consumer can install a program code to a storage or memory of an electronic device, such as a personal computer, such as a desktop or a laptop, a mobile phone, a tablet, or an electronic module or dongle. One way of installing the program code can be through an application store, such as the [GOOGLE PLAY STORE], also known as the Android Apps on Google Play, or the [APPLE APP STORE]. Alternatively, the program code may be preinstalled for use by the consumer. Pre-installation may be especially desirable for implementation in a self-contained electronics module or dongle for connection to another electronic device.

Next, the program code can be executed or initialized to provide the consumer with a graphical user interface at step S302. The execution or initialization can be done either through selection by the consumer or automatically. If the program code is loaded in an electronic dongle, the process can be initiated automatically upon connection of the dongle to another electronic device, or after performing a security handshake and/or registration.

The process can provide and display a database or library of components at step S303. The database or library of components can be provided by a manufacturer for the consumer to select from for production or further modified to then produce, such as by using a 3D printer or by machining. The database can be pre-stored in the program code or accessed from a remote database via a network connection, such as the internet. For example, using the program on a local PC or app on a smartphone, the user can access the remote database to select component or components for printing or for further modification. As another example, the program can be provided through a web-browser dashboard for use online. The user can create an account and after logging into the account, the user can be presented with a user interface with selections and options for selecting and printing. The printer can be a 3D printer and can reside locally with the user or remotely at a fabricating or manufacturing facility. If remote, the printed part can then be shipped to the requester or user. Foreseeably, a service charge may be required to complete the transaction.

The database can be provided in a user friendly visual format. The database can be searchable by keywords or by component categories. The component categories can group variations of a specific type of component. The various components can also be searched using other techniques, such graphically, by pull tabs, or combinations of different searchable techniques.

In some embodiments, the program code may only display particular or sub-set of components from the database. In such a case, there may be particular components that the manufacturer would like to have released to the consumer. This can be the basis for a subscription-based service to access components from the database, as an example.

In some embodiments, the particular components or subset of components are displayed in connection with monthly promotions. Such a set up can be beneficial in urging consumers to continually check the manufacturer's latest offerings.

From the database of components, the consumer can select a specific component for production or can select more than one component for production. From the selection of the component for production, the program code can then generate an output suitable for instructing a production machine to execute at step S304. Such a production machine can be a 3D printer, lathe, mill, extruder, or other computer programable devices, such as CNC machines. The output can be a data file that can either be transmitted directly to the production machine or transferred to the production machine. In addition to producing the component, the output may be for production of an inverse form or mold. Production of such a form or mold would allow for production of the desired component through additional steps using the form or mold, such as with composite lay ups or injection molding techniques. As an example, the system allows the end caps 110 of FIG. 2 to be produced to then attach to the support member 102. The end caps 110 can be produced using a user selected color or colors, a desired contour, desired surface features, such as bumps, grooves, graphics, etc. In other examples, the system allows the user to print inserts or plates for placement into the recessed space of each of the two end caps 110. The inserts or plates can include user selected design, text, graphics, etc. The decorative cover 106 (FIG. 2), if selected to be non-load bearing, can also be printed with custom features, such as colors, surface features, bumps, textures, etc.

In embodiments, the program code can transmit the output data file to a connected production machine at step S305, such as a 3D printer. The 3D printer can use any of OBJ, STL, VRML, X3G, PLY, and FBX data files or other current or future file format for 3D printing. Similarly, the lathe, mill, or extruder can use suitable data files for production from known computer aided manufacturing (CAM) and computer numerical control (CNC).

In some embodiments, the consumer can output the production instructions to a personally owned or attached production machine. Embodiments are envisioned for direct consumer usage with 3D printers. Also, by allowing the output of data files to other production machines, such as to a lathe or milling machine, the system can allow for different production time requirements and component materials. For example, some consumers may prefer to have their component manufactured from a metal billet for aesthetic, strength, and durability reasons while others may be driven by aesthetic reason only.

Additionally, embodiments can be used for larger scale production such as by a licensee of the manufacturer. By providing direct outputting from the software to production machines, such as to an extruder, 3D printer, and/or metal or plastic injection machine, a manufacturer can provide a licensee with a path or option for manufacturing the parts or components without divulging trade secret information.

In the case of the connected production machine, the program code can also continually check the production status at step S306. Upon completion of production of a component by the production machine, the program code can generate a notification or alarm for the consumer to indicate that the component is completed at step S307.

Figure 4:
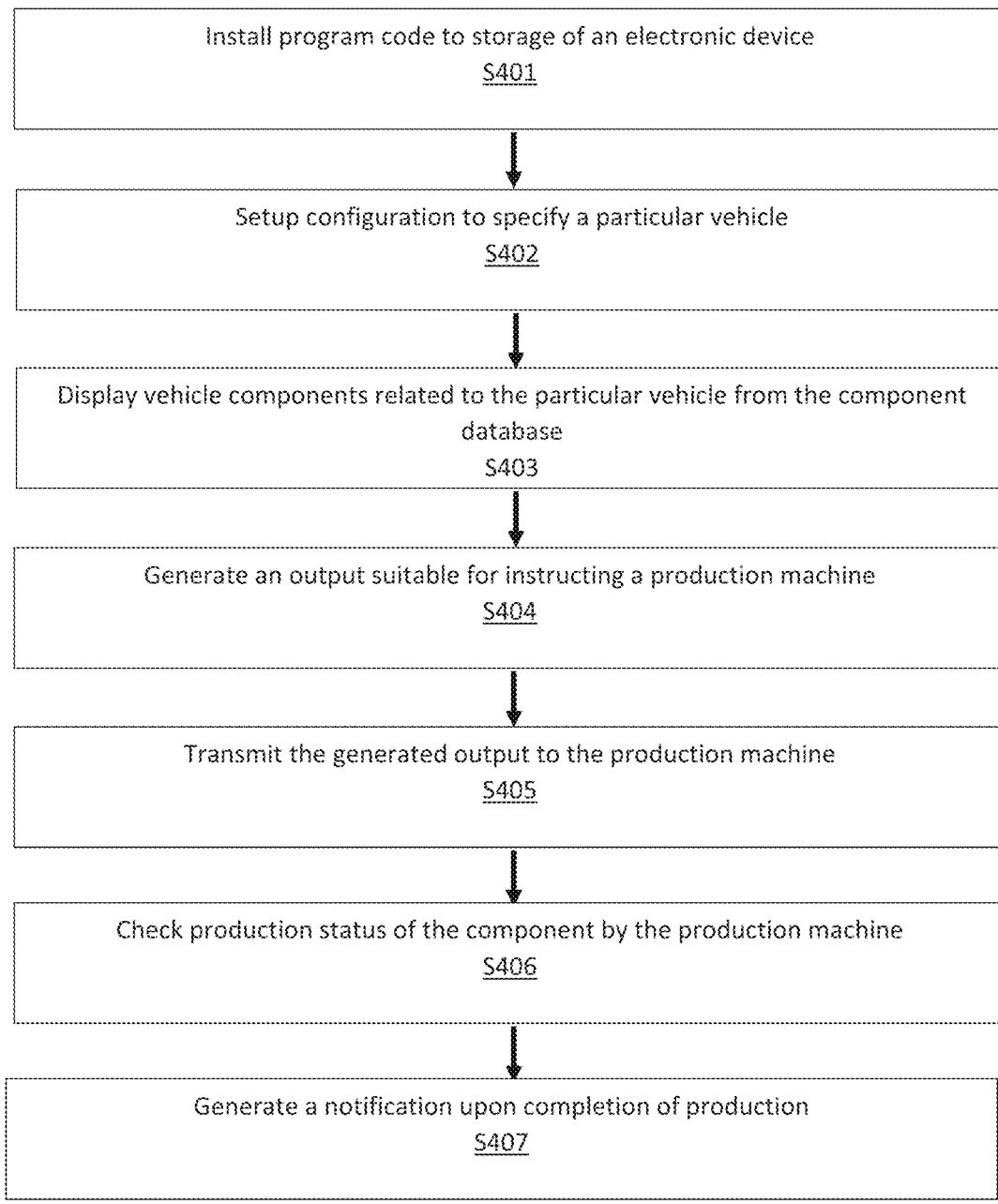
FIG. 4 shows a flowchart of another embodiment of the disclosed process with additional selection features to provide relevant components to the consumer.

FIG. 4 illustrates a flowchart or process for producing components similar to that of FIG. 3 with additional selection features. The process can be implemented by program code stored in a computer readable storage medium for execution by at least one computer processor, such as that illustrated in FIG. 9. The program code can be considered a software or an application.

FIG. 4 illustrates a process wherein the consumer can install the program code to storage of an electronic device, such as a personal computer, a mobile phone, a tablet, or an electronic module or dongle, at step S401. Alternatively, the program code may be preinstalled for use by the consumer. Pre-installation may be especially desirable for implementation in a self-contained electronic module or dongle for connection to another electronic device.

Next, the program code can be executed or initialized to provide the consumer with a graphical user interface for the process. The execution or initialization can be done either through selection by the consumer or automatically. If the program code is loaded in an electronic dongle, the process can be initiated automatically upon connection to another electronic device.

The process can provide a configuration setup at step S402 wherein the consumer can specify the vehicle that they would like to produce components for or can be provided with a limited list of components or parts within an assembly, such as the support device 100, for producing. For example, the user can be presented with options for printing a decorative cover 106 or an end cover 100. For other accessories, the user can be presented with other component options for printing.

The process can provide and display a database or library of components that is tailored for the specified vehicle at step S403, which has been provided by a manufacturer, for the consumer to select for production. The database can be pre-stored in the program code or accessed from a remote database via a network connection, such as the internet.

With the configuration setup step S402, it is possible to have a significantly larger database for many different vehicles and the list of components can be tailored for the consumer's consideration. Furthermore, the database can be provided in a user friendly visual format. The database can be searchable by keywords or by component categories. The component categories can group variations of a specific type of component.

In some embodiments, the program code may only display particular or subset of components from the database. In such a case, there may be particular components that the manufacturer would like to have released to the consumer, with conditions. This can be the basis for a subscription-based service to access components from the database.

In some embodiments, the particular components that are only selectively made available can be envisioned for usage in monthly promotions. Such a set up can be beneficial in urging consumers to continually check the manufacturer's latest offerings.

From the database of components, the consumer can select a specific component for production. In some examples, the user can be provided with a graphical display of an assembly or device with only parts or components within the assembly to be producible by a user enabled for selection. From the selection of the component for production, the program code can then generate an output suitable for instructing a production machine at step S404. Such a production machine can be a 3D printer, lathe, mill, extruder, or other computer program machines, such as CNC machines. The output can be a data file that can either be transmitted directly to the production machine or transferred to the production machine. In addition to producing the component, the output may be for production of an inverse form or mold. Production of such a form or mold would allow for production of the desired component through additional steps using the form or mold, such as with composite lay ups or injection molding techniques.

In embodiments, the program code can transmit the output data file to a connected production machine at step S405. The 3D printer can use any of OBJ, STL, VRML, X3G, PLY, and FBX data files or other current or future file format for 3D printing. Similarly, the lathe, mill, or extruder can use suitable data files for production from known computer aided manufacturing (CAM) and computer numerical control (CNC).

In some embodiments, the consumer can output the production instructions to a personally owned or attached production machine. Embodiments are envisioned for directing the data file by a consumer to a connected 3D printer. Also, by allowing output of data files to other production machines, such as lathes and mills, the system can allow for different production time requirements and component materials. For example, some consumers may prefer to have their component manufactured from metal billet for aesthetic reasons.

Additionally, embodiments can be used for larger scale production such as by a licensee of the manufacturer. By providing direct outputting from the software to the production machine, such as an extruder, the system allows a manufacturer to enable a licensee with means for practicing the device or apparatus without having to directly transfer trade secret information to the licensee.

In the case of the connected production machine, the program code can also continually check the production status at step S406. Upon completion of production of the component by the production machine, the program code can generate a notification or alarm for the consumer to indicate that the component is completed at step S407.

Figure 5:
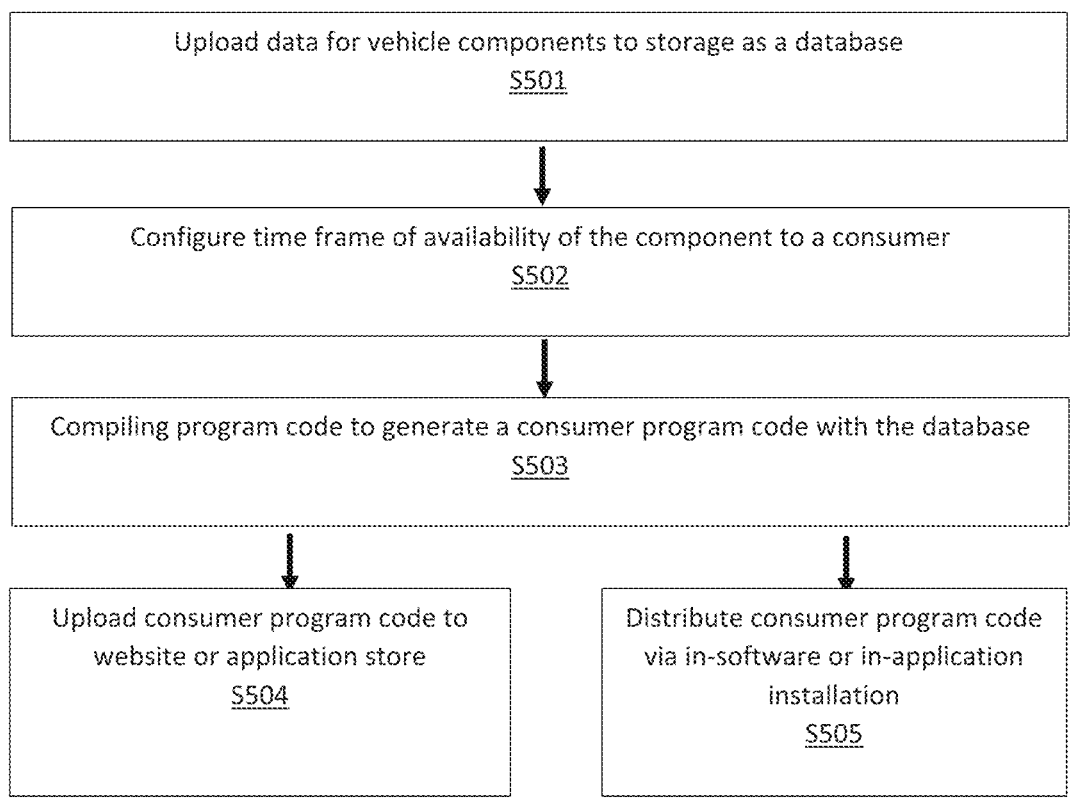
FIG. 5 shows a flowchart for an embodiment where the manufacturer program code can be used to provision the database and generate a consumer program code in the form of a software or application for installation on an electronic device used by the consumer.
Figure 6:
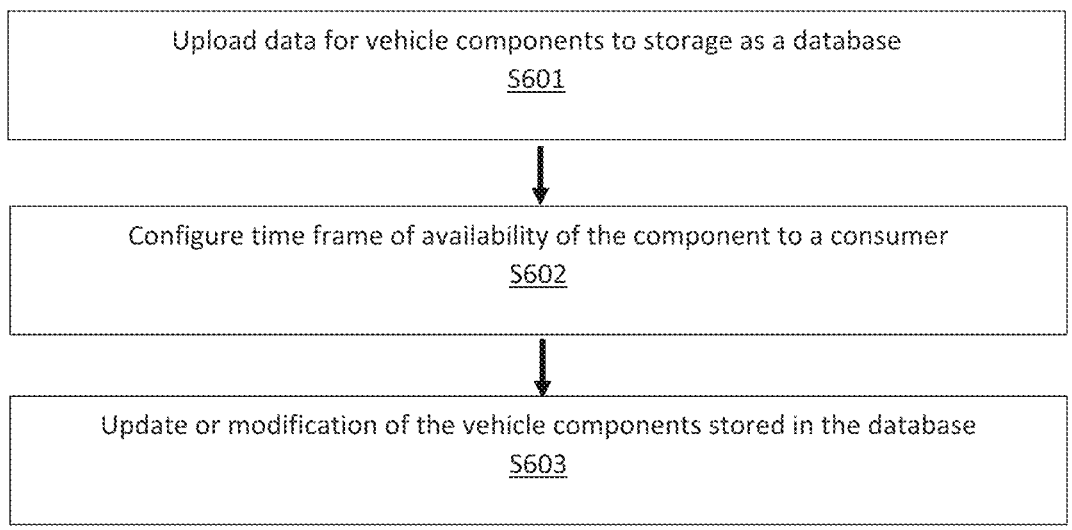
FIG. 6 shows a flowchart for an embodiment where the manufacturer program code is utilized for generating and maintaining a database of vehicle components as a stand-alone accessible database for use with separately created consumer program code.

FIGS. 5 and 6 illustrate flowcharts for embodiments involving a manufacturer providing a database having designs for the consumer to access and set about producing the design, such as with a production machine. The process of FIG. 5 can be understood as corresponding to the consumer implemented program code of FIGS. 3, 4, 7, and 8. The manufacturer's process can be implemented by manufacturer program code stored in a computer readable storage medium for execution by at least one computer processor, such as that illustrated in FIG. 10. The program code can be considered a software, an application, or a web page dashboard.

The manufacturer program code can be used to provision the database and generate a consumer program code in the form of a software or application for installation on an electronic device used by the consumer, such as the embodiments of FIGS. 3, 4, 7, and 8. Alternatively, the manufacturer program code can be used to provision the database as a standalone accessible database for use with a separately created consumer program code.

FIG. 5 illustrates a flowchart for an embodiment where the manufacturer program code can be used to provision the database and generate a consumer program code in the form of a software or application for installation on an electronic device used by the consumer. In such a case, the database of components can be stored locally on the consumer electronic device as part of the consumer program code.

The process can allow for uploading data for component or components to be produced to a computer readable storage at step S501. The data for the one or more components, which can be for a vehicle or for other devices, can then be accessible by the manufacturer program code when creating the consumer program code such that the data for the components to be produced is incorporated into the consumer program code.

In embodiments, the data for the individual components stored in the database can include data or metadata to identify specific vehicles that the component will fit with. This can aid in categorization or identification of relevant components for the consumer, as in steps S304, S403, and S404 of the embodiments of FIGS. 3 and 4.

Figure 7:
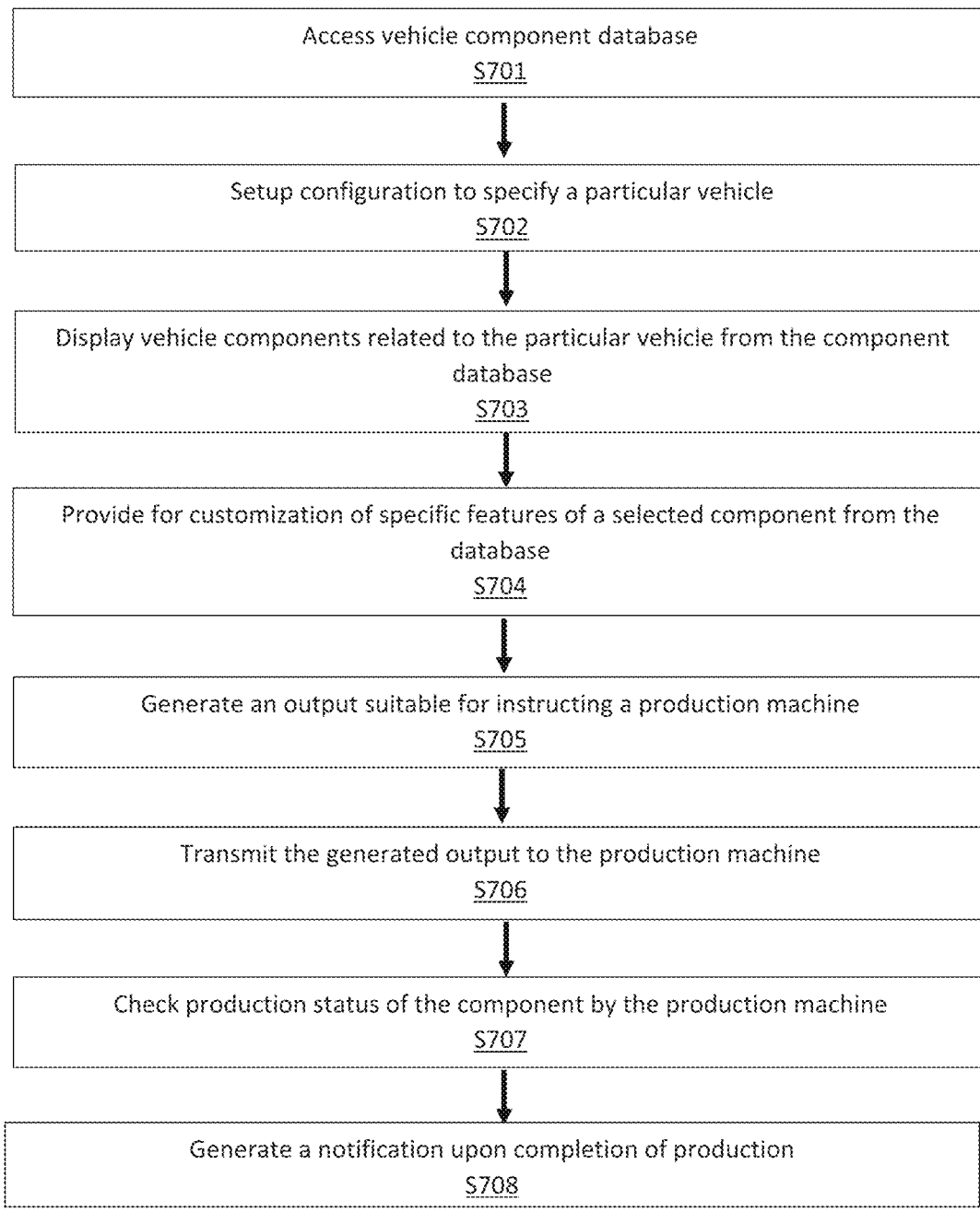
FIG. 7 shows a flowchart for an embodiment of a consumer program code allowing for generally automated customization options.
Figure 8:
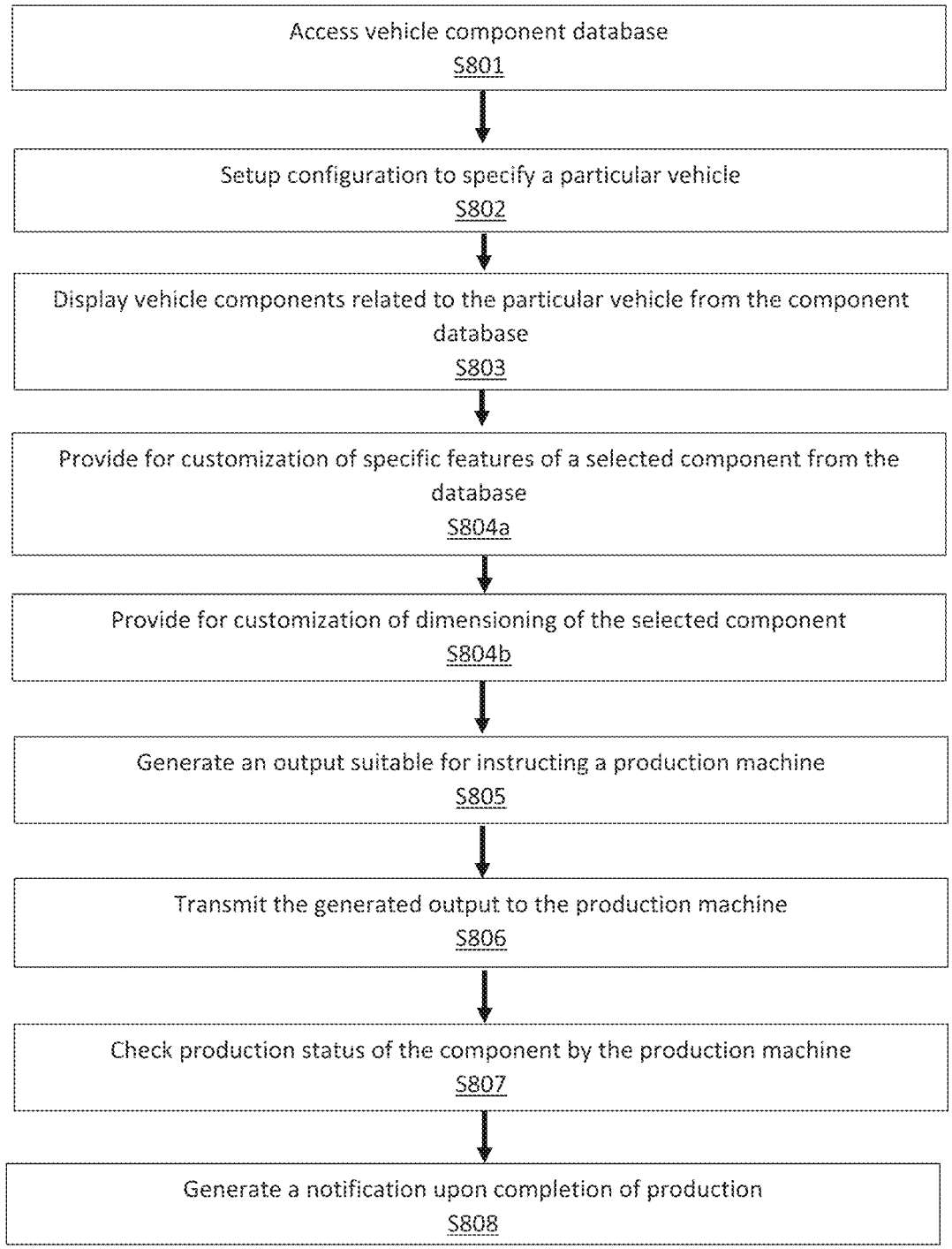
FIG. 8 shows a flowchart for an embodiment allowing for additional customization based on consumer dimensioning adjustments beyond changing aesthetics.

In some embodiments, to accommodate customizability by the consumer as shown in the embodiments of FIGS. 7 and 8, specific features of certain components can be identified as customizable. The data for the individual components stored in the database can include identification of specific dimensions or areas of the components that can be altered or customizable. Embodiments of processes as to how a consumer can customize components are described further below with reference to FIGS. 7 and 8. Additionally, data of variations of the specific feature that is customizable can be stored in the database separately from vehicle component data. Alternatively, data of variations of the specific feature can be drawn from the plurality of vehicle components with a similar specific feature identified as customizable. The indication of similarity can be saved in the data or metadata of the component.

Optionally, the process can include time configuration of when individual components should be made available to the consumer at step S502. In such a case, only identified components can be shown by the consumer program code for production. This feature can also allow for in-house manufacturing testing of a component from the database before general release.

Next, the process can include compiling program code at step S503 to provide software or an application to provide the database and time configuration in consumer program code such that the consumer has consumer program code according to embodiments shown in FIGS. 3, 4, 7, and 8.

After creation of the consumer program code at step S503, the process can include either distribution to consumers via downloading from the Cloud by the consumer at step S504 or an in-software or in-application installation option at step S505. The upload can be to a website or an application store, such as the [GOOGLE PLAY STORE] or the [APPLE APP STORE]. With the in-software or in-application installation option at step S505, a link can be provided through either existing software/application as an update or through a tangentially related software/application from the manufacturer.

In this way, the consumer program code can operate locally without connection to an external network, as the data for the components is included with the consumer program code.

Alternatively, older styles of distribution including sending the consumer program code to physical media printing, such as to a compact disc (CD), can also be envisioned.

FIG. 6 illustrates a flowchart for an embodiment where the manufacturer program code is utilized for generating and maintaining a database of vehicle components or components for use with a vehicle as a standalone accessible database for use with separately created consumer program code. In other examples, the manufacturer can have a database containing components from non-automobile type components, such as components for a suitcase, for a backpack, for shoes, for a computer, for household goods, for consumer goods, such as a smartphone cover, etc. These non-automobile type components can be incorporated within a system as discussed herein for vehicle components or components for use with a vehicle.

In the present embodiment, the database of vehicle components is stored on a network accessible storage, such that consumer program code for consumer electronic devices can access the network accessible database as needed. Such a network could include the internet or an intranet using a smartphone, a tablet, or a computer.

The process can allow for uploading data for vehicle components to computer readable storage at step S601 for the formation of the database.

In embodiments, the data for the individual components stored in the database can include data or metadata to identify specific vehicles that the component will fit with. This can aid in categorization or identification of relevant components for the consumer, as in steps S304, S403, and S404 of the embodiments of FIGS. 3 and 4.

In some embodiments, to accommodate customizability by the consumer as shown in the embodiments of FIGS. 7 and 8, specific features of the component can be identified as customizable. The data for the individual components stored in the database can include identification of specific dimensions or areas of the components that can be altered. Embodiments of processes as to how a consumer can customize components are described further below with respect to FIGS. 7 and 8. Additionally, data of variations of the specific feature that is customizable can be stored in the database separately from the vehicle component data. Alternatively, data of variations of the specific feature can be drawn from the plurality of vehicle components with a similar specific feature identified as customizable. The indication of similarity can be saved in the data or metadata of the component.

Optionally, the process can include time configuration of when individual components should be made available to the consumer at step S602. In such a case, only identified components can be shown by the consumer program code for production.

After initial uploading of the vehicle components, the manufacturer program code can also allow for updating or modification at step S603 of individual vehicle components. For example, the manufacturer program code can allow for identification of specific features of the vehicle component for customization in what was initially uploaded as a non-customizable component. Additional disclosure of customizable features is provided below with respect to FIGS. 7 and 8.

FIGS. 7 and 8 provide flowcharts for embodiments of processes for consumer program code that can allow for customization of components. In allowing the consumer to utilize their own tooling to produce the components, the system provided by the manufacturer can allow for customization of features in ways that would not be possible with traditional mass production.

FIG. 7 illustrates a flowchart for an embodiment of a consumer program code allowing for generally automated customization options. For example, this can include replacement of aesthetic designs or features, the placement of text or logos on surfaces of the component, and the use of different colors and color combinations to make the component and the customized features. Such customization can be done simply without need to redesign the vehicle component.

The consumer program code can access and display a database or library of components at step S701, which has been provided by a manufacturer, for the consumer to select for production. The database can be pre-stored in the program code or accessed from a remote database via a network connection, such as the internet.

The database can be provided in a user friendly visual format. The database can be searchable by keywords, by component categories, or graphically by pictures or drawings. The component categories can group variations of a specific type of component.

In some embodiments, the program code may only display particular components from the database. In such a case, there may be particular components that the manufacturer would like to have released to the consumer. As shown in FIG. 4, this can include additional selections by the consumer as to specific vehicles that the consumer is interested in components for. The process can provide a configuration setup at step S702 wherein the consumer can specify the vehicle that they would like to produce components for use with. The process can provide and display a database or library of components that is tailored for the specified vehicle S703, which has been provided by a manufacturer, for the consumer to select for production. From the database of components, the consumer can select a specific component for customization prior to production.

After selection of the component, the process can include providing a user interface for customization of the component at step S704. Specific areas that identified as customizable may also have a variety of aesthetic variations available for selection. For example, in the case of a step 104 or a decorative cover 106 (FIG. 2), an aesthetic pattern provided on the step 104 or decorative cover 106 can be altered. The consumer program code can provide for a listing of alternative aesthetic patterns for the specific feature. Examples of this may include a visual list showing the different variations that can be used. In some examples, the system can allow multiple components to be accessed, customized, and produced.

Additionally, relatively simple customization such as the addition of text or logos on a surface of a component can be achieved. By allowing a consumer to directly include text or a logo into or onto the component, the end result is a more professional, handcrafted, uniqueness, or luxury feel to the component rather than mass produced.

Following customization, the consumer program code can then generate an output suitable for instructing a production machine at step S705. Such a production machine can be a 3D printer, lathe, mill, extruder, or other devices. The output can be a data file that can either be transmitted directly to the production machine or transferred to the production machine. In addition to producing the component, the output may be for production of an inverse form or mold. Production of such a form or mold would allow for production of the desired component through additional steps using the form or mold, such as with composite lay ups or injection molding techniques.

In embodiments, the program code can transmit the output data file to a connected production machine at step S706. The 3D printer can use any of OBJ, STL, VRML, X3G, PLY, and FBX data files or other current or future file format for 3D printing. Similarly, the lathe, mill, or extruder can use suitable data files for production from known computer aided manufacturing (CAM) and computer numerical control (CNC).

In some embodiments, the consumer can output the production instructions to a personally owned or attached production machine. Embodiments are envisioned where the consumer can send the data file directly to a local 3D printer for immediate production and use. Also, by allowing outputting to other production machines, such as lathes and mills, the system can allow for different production time requirements and component materials. For example, some consumers may prefer to have their component manufactured from metal billet for aesthetic reasons.

In the case of the connected production machine, the program code can also continually check the production status at step S707. Upon completion of production of the component by the production machine, the program code can generate a notification or alarm for the consumer to indicate that the component is completed at step S708.

FIG. 8 illustrates a flowchart for an embodiment for customization similar to that of FIG. 7, but allows for additional customization based on consumer dimensioning adjustments beyond changing aesthetic features.

The flowchart of FIG. 8 is similar to the embodiment of FIG. 7 and has corresponding steps with some changes.

The consumer program code can access and display a database or library of components at step S801, which has been provided by a manufacturer, for the consumer to select for production.

In some embodiments, the program code may only display particular components from the database. In such a case, there may be particular components that the manufacturer would like to have released to the consumer while withholding some others. As shown in FIG. 7, this can include additional selection by the consumer as to specific vehicles that the consumer is interested in components for. The process can provide a configuration setup at step S802 wherein the consumer can specify the vehicle that they would like to produce components for. The process can provide and display a database or library of components that is tailored for the specified vehicle at step S803, which has been provided by a manufacturer, for the consumer to select for production. From the database of components, the consumer can select a specific component for customization prior to production. The consumer can repeat the steps for additional components. In some instances, the system allows multiple components to be customized at the same time.

After selection of the component for customization in FIG. 8, the process can include customization at step S804a. As with the embodiment of FIG. 7, specific areas that identified as customizable may also have a variety of aesthetic variations available for selection. Additionally, relatively simple customization such as the additional of text or logos on a surface of a component can be achieved.

Beyond the simplistic customization, the embodiment can allow customization of dimensions of the component at step S804b. In this case, the consumer can be provided with the ability to customize dimensions such as length or height of the component. As an example, this has benefits by accommodating varying vehicle dimensions due to different models or due to personal aesthetic preference or taste. The customization can be done through numerical entries of desired dimensions or through a visual interface showing the component.

Following the step that allows for adjustments in dimensions, production of the component can be achieved similarly to the embodiment of FIG. 7.

Following customization, the consumer program code can then generate an output suitable for instructing a production machine at step S805. Such a production machine can be a 3D printer, lathe, mill, extruder, or other. The output can be a data file that can either be transmitted directly to the production machine or transferred to the production machine. In addition to producing the component, the output may be for production of an inverse form or mold. Production of such a form or mold would allow for production of the desired component through additional steps using the form or mold, such as with composite lay ups or injection molding techniques.

In embodiments, the program code can transmit the output data file to a connected production machine at step S806. The 3D printer can use any of OBJ, STL, VRML, X3G, PLY, and FBX data files or other current or future file format for 3D printing. Similarly, the lathe, mill, or extruder can use suitable data files for production from known computer aided manufacturing (CAM) and computer numerical control (CNC).

In some embodiments, the consumer can output the production instructions to a personally owned or attached production machine. Embodiments are envisioned where the consumer can send the data file directly to a local 3D printer for immediate production and use. Also, by allowing output to other production machines, such as lathes and mills, the system can allow for different production time requirements and component materials. For example, some consumers may prefer to have their component manufactured from metal billet for aesthetic reasons.

In the case of the connected production machine, the program code can also continually check the production status at step S807. Upon completion of production of the component by the production machine, the program code can generate a notification or alarm for the consumer to indicate that the component is completed at step S808.

Figure 9:
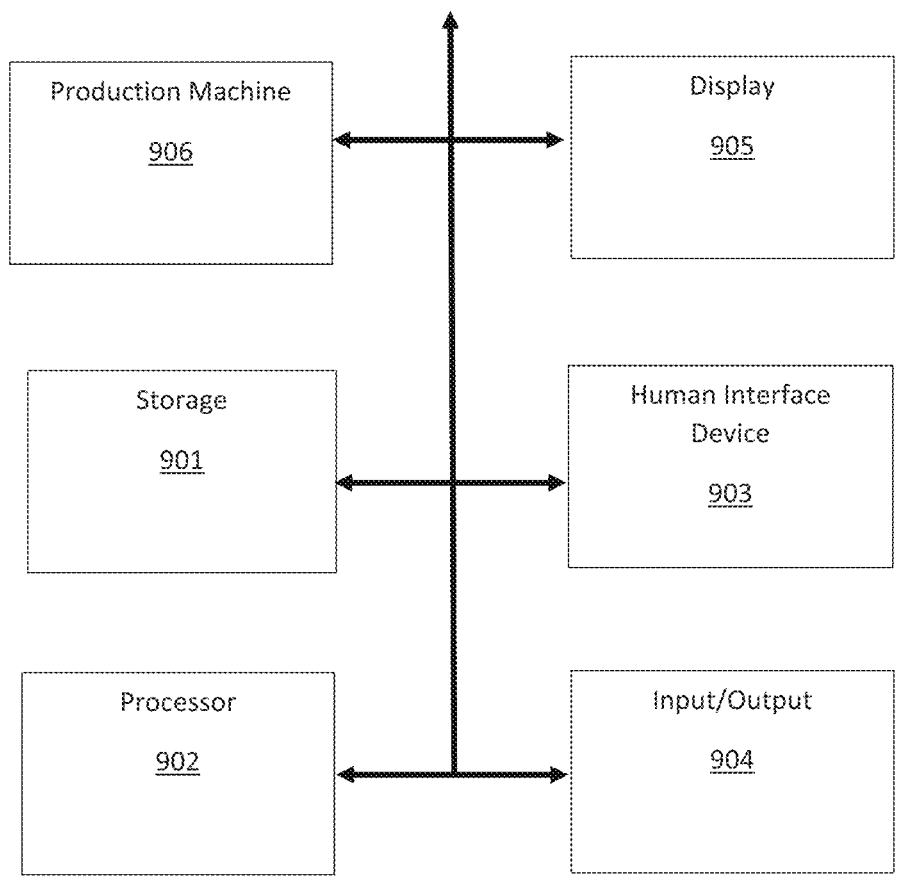
FIG. 9 shows an exemplary embodiment of a system that can be used to implement the consumer program code.

FIG. 9 illustrates an exemplary embodiment of a system that can be used to implement the consumer program code of FIGS. 3, 4, 7, and 8. The system can include a computer readable storage medium 901, a processor 902, and an input/output module 904. The input/output module 904 can include network communication ports or physical media interfacing for interfacing the generated output for production of the vehicle component with the production machine. These elements can form the basis of an electronic device to implement the consumer program code. For example, these elements could be part of an electronic dongle. Additionally, the system can include a human interface device 903 and a display 905 for interfacing by the consumer. Furthermore, a production machine 906 can be attached to the system. In some embodiments, the computer readable storage medium 901, the processor 902, and the input/output module 904 can be integral with the production machine 906.

Figure 10:
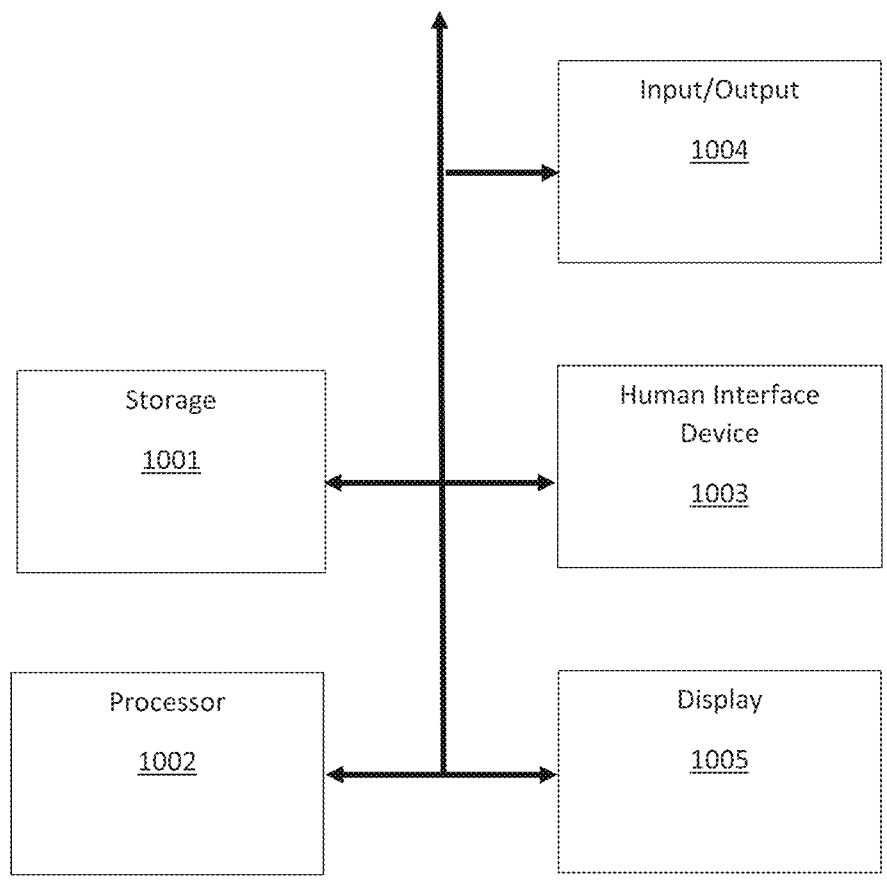
FIG. 10 shows an exemplary embodiment of a system that can be used to implement the manufacturer program code.

FIG. 10 illustrates an exemplary embodiment of a system that can be used to implement the manufacturer program code of FIGS. 5 and 6. The system can include a computer readable storage medium 1001, a processor 1002, and an input/output module 1004. The input/output module 1004 can include network communication ports or physical media interfacing. These elements can form the basis of an electronic device to implement the manufacturer program code. Additionally, the system can include a human interface device 1003 and a display 1005 for interfacing by the consumer.

Figure 11:
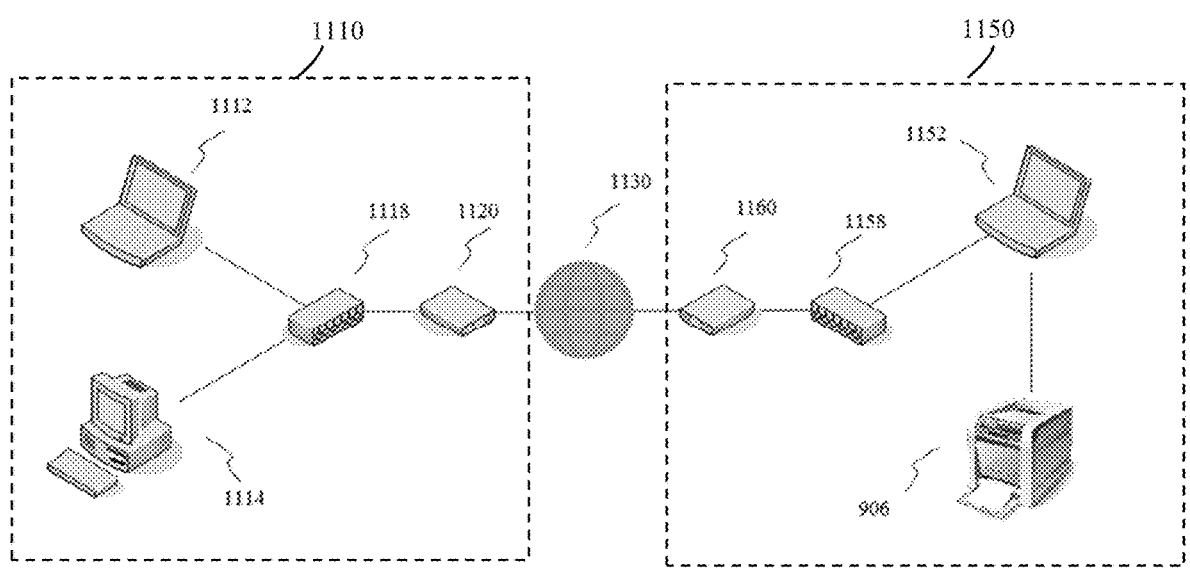
FIG. 11 shows an exemplary embodiment of a manufacturer system connected through a network infrastructure to a consumer system.

FIG. 11 is an exemplary embodiment of a manufacturer system 1110 connected through a network infrastructure 1130 to a consumer system 1150. The manufacturer system 1110 can include the components necessary to implement the manufacturer program code, such as that seen in FIG. 10. The manufacturer system 1110 can include at least one computer or workstation 1112 having the components of the computer readable storage medium 1001, the processor 1002, and the input/output module 1004 described in the embodiment of FIG. 10. In some cases with larger companies, it is likely that the manufacturer will have multiple computers or workstations 1114 in the manufacturer system, any of which can implement the manufacturer program code. In embodiments, the computers will be connected to a router 1118 and a modem 1120 for connection to each other and to the network infrastructure 1130 outside of the manufacturer system 1110. Alternatively, the manufacturer system 1110 can be a remote cloud network with virtual machine provisioning for the manufacturer to interface with the cloud network.

The network infrastructure 1130 can be the internet or an intranet infrastructure. The manufacturer system 1110 can connect to the network infrastructure 1130 through the modem 1120 and an internet service provider.

The consumer system 1150 can include the components necessary to implement the consumer program code, such as that seen in FIG. 9. The consumer system 1150 can include at least one computer or workstation 1152 having the components of the computer readable storage medium 901, the processor 902, the input/output module 904, and the production machine 906 described in the embodiment of FIG. 9. In embodiments, the computer 1152 will be connected to a router 1158 and a modem 1150 for connection to the network infrastructure 1130 outside of the manufacturer system 1110. Alternatively, the consumer system 1150 can be a remote cloud network with virtual machine provisioning for the consumer to interface with the cloud network.

Systems and methods of making the vehicle components or components for use with a vehicle or for other applications are understood to be within the scope of the present disclosure.

Although limited embodiments of systems and processes for producing support devices, assemblies, their components, and various vehicle components have been specifically described and illustrated herein, many modifications and variations will be apparent to those skilled in the art. For example, the processes may incorporate multi-machine production techniques, hand-finishing of components, and alternative production machines, etc. Furthermore, it is understood and contemplated that features specifically discussed for one embodiment may be adopted for inclusion with another embodiment, provided the functions are compatible. Accordingly, it is to be understood that the systems and processes for producing support devices, assemblies, and their components constructed according to principles of the disclosed device, system, and method may be embodied other than as specifically described herein. The disclosure is also defined in the following claims.

What is claimed is:

1. A method for production of vehicle components directed by a consumer interacting with a computer, comprising:
retrieving a listing of vehicle components from a vehicle component database, components on the listing of vehicle components are attachable to a produced good on a vehicle;
displaying a subset of the listing of vehicle components to the consumer based on a time period defined by a manufacturer associated with the vehicle components or a consumer subscription for purchasing promotional vehicle components during a pre-defined time period;
selecting a promotional vehicle component for coupling to the produced good from the vehicle component database based on a selection input from the consumer from the subset of the listing of vehicle components;
following receipt of the selection input from the consumer, the computer generating an output data file from data for the promotional vehicle component from the vehicle component database, the output data file being configured to be readable by a production machine and to instruct the production machine to produce the promotional vehicle component;

transmitting the output data file to the production machine; and causing the production machine to produce the promotional vehicle component based on the output data file; and wherein the promotional vehicle component produced by the production machine is attachable to the produced good for the vehicle.

2. The method of claim 1, wherein the production machine comprises one of a 3D printer, a mill, a lathe, and an extruder.

3. The method of claim 2, wherein the vehicle component database is remotely located from the production machine and is accessed through a network.

4. The method of claim 2, further comprising:
identifying a particular produced good in order to generate a listing of vehicle components relevant to the particular produced good from the vehicle component database.

5. The method of claim 2, further comprising:
receiving a modification input from the consumer; and
modifying the promotional vehicle component selected from the vehicle component database in accordance with the modification input before generating the output data file.

6. The method of claim 5, wherein the modifying comprises changing a design on the selected promotional vehicle component.

7. The method of claim 5, wherein the modifying comprises changing a dimension of the selected promotional vehicle component.

8. The method of claim 5, wherein the modifying comprises adding text or a graphic logo to a surface of the selected promotional vehicle component.

9. The method of claim 2, further comprising:
checking a status of production of the promotional vehicle component by the production machine; and
displaying an alert to the consumer upon completion of production by the production machine.

10. The method of claim 2, wherein the promotional vehicle component comprises an end cap that couples to the produced good.

11. The method of claim 1, wherein retrieving the listing from the vehicle component database comprises retrieving the listing from a remote vehicle component database located with a manufacturer and wherein the production machine is located with the consumer.

12. The method of claim 1, further comprising providing the promotional vehicle component produced by the production machine to the consumer for coupling the vehicle component to the produced good mounted to the vehicle for moving with the vehicle.

13. The method of claim 2, wherein the promotional vehicle component comprises an aerodynamic component in the form of a spoiler, a canard, a splitter, or a diffuser.

14. A system for production of vehicle components for a produced good linked to a vehicle comprising:
a production machine;
a processor;
a non-transitory computer readable storage medium having a program code executable by the processor, the program code configured to:
retrieve a list of vehicle components for coupling to an assembly comprising the produced good from a vehicle component database;
display a subset of the list of vehicle components to the consumer based on a time period defined by a manufacturer associated with the vehicle components and a consumer subscription for purchasing promotional vehicle components;
receive a selection input from the subset of the list of vehicle components from a user;
select a promotional vehicle component from the vehicle component database based on the selection input;
generate an output data file from data for the promotional vehicle component selected from the vehicle component database; the output data file configured to be readable by the production machine and to instruct the production machine to produce the promotional vehicle component for coupling to the assembly of the produced good; and
transmit the output data file to the production machine to instruct the production machine to produce the promotional vehicle component for coupling to the assembly of the produced good.

15. The system of claim 14, wherein the production machine comprises one of a 3D printer, a mill, a lathe, and an extruder.

16. The system of claim 15, wherein the vehicle component database is remotely located from the production machine and is accessed through a network.

17. The system of claim 15, wherein the program code further comprises:
identifying a particular produced good in order to generate a listing of vehicle components relevant to the particular produced good from the vehicle component database.

18. The system of claim 15, wherein the program code is further configured to:
receive a modification input from the user; and
modify the promotional vehicle component selected from the vehicle component database based on the modification input before generating the output data file.

19. The system of claim 18, wherein the modifying comprises changing a design on the selected promotional vehicle component.

20. The system of claim 18, wherein the modifying comprises changing a dimension of the selected promotional vehicle component.

21. The system of claim 18, wherein the modifying comprises adding text or a graphic logo to a surface of the selected promotional vehicle component.

22. The system of claim 14, wherein the program code further comprises:
checking a status of production of the promotional vehicle component by the production machine; and
displaying an alert upon completion of production by the production machine.

23. The system of claim 14, further comprising:
an input/output module configured to communicate electronically with the production machine.

24. The system of claim 18, wherein the program code is further configured to identify a modifiable area of the promotional vehicle component and a non-modifiable area of the promotional vehicle component, and modifying the promotional vehicle component comprises changing the modifiable area while keeping the non-modifiable area intact.

25. The system of claim 15, wherein the promotional vehicle component comprises an end cap that couples to the produced good.

26. The system of claim 15, wherein the promotional vehicle component comprises an aerodynamic component in the form of a spoiler, a canard, a splitter, or a diffuser.

\* \* \* \* \*